United States Patent
Rickey (12)

(10) Patent No.: US 6,304,965 B1
(45) Date of Patent: Oct. 16, 2001

(54) METHOD AND DEVICE FOR BOOTING A CD-ROM FROM A SINGLE DISK IMAGE HAVING MULTIPLE EMULATIONS

(75) Inventor: Albert E. Rickey, Lake Forest, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/162,512

(22) Filed: Sep. 29, 1998

(51) Int. Cl.$^7$ ........................................ G06F 9/445
(52) U.S. Cl. ........................... 713/2; 713/100; 709/221
(58) Field of Search .................... 713/1, 2, 100; 395/700; 714/38; 709/220, 221, 222

(56) References Cited

U.S. PATENT DOCUMENTS

| | | | |
|---|---|---|---|
| 5,325,532 | * 6/1994 | Crosswy et al. | 713/1 |
| 5,459,867 | * 10/1995 | Adams et al. | 395/700 |
| 5,475,845 | * 12/1995 | Orton et al. | 395/700 |
| 5,692,190 | 11/1997 | Williams | 395/652 |
| 5,694,583 | * 12/1997 | Williams et al. | 713/2 |
| 5,701,477 | * 12/1997 | Chejlava, Jr. | 713/2 |
| 5,727,213 | * 3/1998 | Vander Kamp et al. | |
| 5,802,363 | * 9/1998 | Williams et al. | 713/2 |
| 5,864,698 | * 1/1999 | Krau et al. | 713/2 |
| 5,887,263 | 3/1999 | Nguyen et al. | |
| 5,903,718 | * 5/1999 | Marik | 714/38 |
| 5,944,820 | * 8/1999 | Beelitz | 713/1 |

OTHER PUBLICATIONS

Stevens, Curtis E. and Merkin, Stan, "El Tirito" Bootable CD–ROM Format Specification, published by Phoenix Technologies and IBM, (version 1.0), Jan. 25, 1995; pp. 1–18.

* cited by examiner

Primary Examiner—Thomas Lee
Assistant Examiner—Ri Jue Mai

(57) ABSTRACT

A method and computer system including a bootable storage media, preferably a CD-ROM, having a single bootable disk image that allows multiple emulations. A hard disk boot image including an MBR is provided at the beginning of the bootable disk image. A floppy DBR is provided at a predetermined sector boundary in the hard disk image so that the computer system can use either the hard disk or the floppy disk emulation at boot time. A computer article of manufacture embodying a single bootable disk image that allows both a hard disk or a floppy disk emulation is also provided.

24 Claims, 11 Drawing Sheets

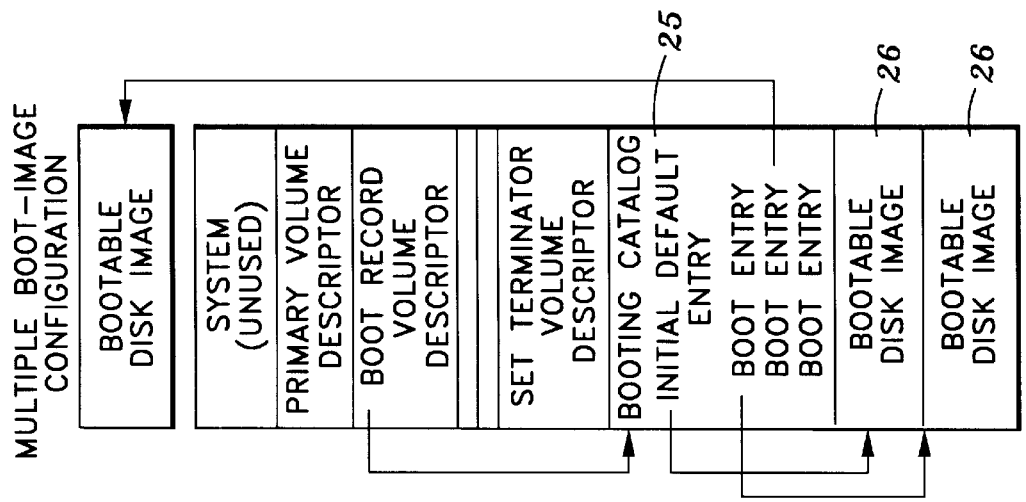
FIG. 2C (PRIOR ART) MULTIPLE BOOT-IMAGE CONFIGURATION
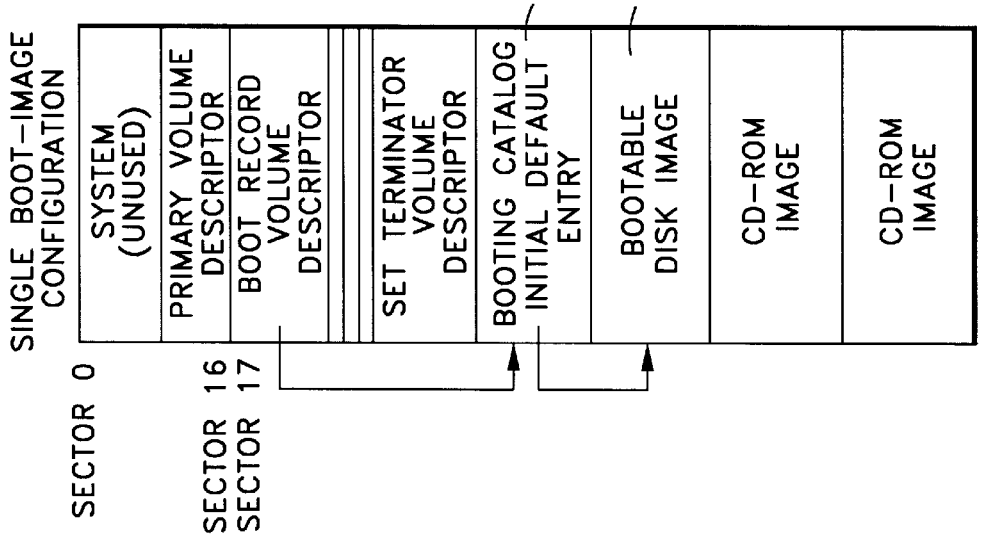
FIG. 2B (PRIOR ART) SINGLE BOOT-IMAGE CONFIGURATION
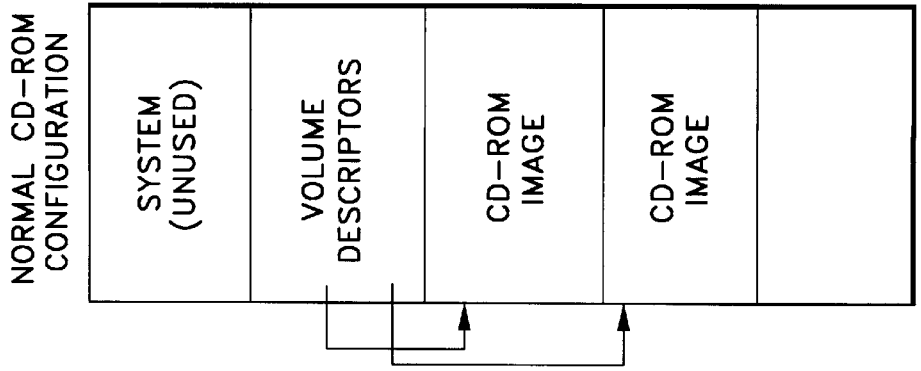
FIG. 2A (PRIOR ART) NORMAL CD-ROM CONFIGURATION

METHOD AND DEVICE FOR BOOTING A CD-ROM FROM A SINGLE DISK IMAGE HAVING MULTIPLE EMULATIONS

BACKGROUND OF THE INVENTION

1. Field of the Invention

This invention relates generally to the field of computer storage, and more particularly to bootable storage media that can emulate either a hard disk or a floppy disk.

2. Background of the Related Art

Before a computer can run an operating system, it must load the operating system into the computer's working memory. This process is ordinarily carried out by a process called "bootstrapping," or "booting." Booting occurs automatically when a computer is powered on or can be specifically invoked by a user on a running computer.

Typically, the booting process of a computer searches a storage media (floppy disk, hard drive, or CD-ROM) for an operating system to be loaded and this function is usually controlled by firmware stored in one or more Basic Input-Output system ("BIOS") chips in the computer. After locating a disk with a valid boot record, the BIOS program reads the data stored on the first sector of the disk and copies that data into specific locations in the computer's Random Access Memory ("RAM"). In a typical, Personal Computer ("PC"), this data constitutes the DOS Boot Record. Execution of code contained in the DOS Boot Record causes the computer to load the remaining files and code that comprise the operating system.

Traditionally, the usual kinds of storage media were the hard drive and the floppy disks, which are magnetic media. More recently, CD-ROMs, which are optical media, have become very popular as they store large amounts of data. CD-ROM's have the attributes of both hard drives and floppy disks in that they have the larger storage capacity of the hard drives and the easy removability of floppy disks. CD-ROM's are formatted with a boot record residing at a prescribed sector on the CD-ROM. The boot record points to a boot catalog that provides descriptions and locations of hard drive and floppy disk image emulations recorded on the CD-ROM, one or more of which may be bootable and may carry an operating system.

Image formats of these three types of media are hierarchical in structure, with the floppy disk being the lowest and the CD-ROM the highest. That is, each medium adds layers or regions of storage information to the mediums that are below it. Therefore, the floppy disk image has the fewest layers of information, the hard disk adds a few additional layers of information and a CD-ROM adds even more layers of information.

FIG. 1 depicts the image formats of the three media with the floppy disk 10 starting with a boot record 11, which is short program that loads the operating system into main memory, followed by a pair of File Allocation Tables 12 (or "FAT"). Thereafter, there is a root directory 13 which maps the files that are stored in a data storage area 14.

The structure of a fixed disk 15 includes all the same regions as are found in a floppy disk but additionally includes a master boot record 16 that includes a partition table 17. The partition tables 17 define the logical partitions on the disk each of which can contain a separate operating system. The master boot record contains code that determines the active partition at boot time to determine the appropriate operating system to load.

The CD-ROM 20 further adds table of descriptors 21, such as that defined by ISO 9660, as the non-reserved first record of the CD-ROM. Following the table of descriptors 21, is a boot catalog directory 22 that points to the stored image files and identifies the image characteristics. The ISO 9660 specification provides, optionally, new boot capabilities for personal computers. Further details of a CD-ROM emulated as a hard disk or a floppy diskette is provided in the background section of U.S. Pat. No. 5,692,190 ("'190 patent"), issued to Williams on Nov. 25, 1997. The disclosure of background section of the '190 patent is incorporated herein, in its entirety.

These boot capabilities for the PC's have been further expanded by the El Torito bootable CD-ROM specification, Version 1.0, jointly developed by Phoenix Technologies and IBM Corporation. This specification defines four formats of bootable CD-ROM's. These formats are floppy drive emulation, hard drive emulation, no emulation, and multiple boot images. The purpose of having the two drive emulation images is to allow the Basic Input-Output System ("BIOS") to use the images as a virtual disk drive. The BIOS en assigns a drive number to the image and allows it to be used as a read only hard drive floppy drive. The disclosure of the El Torito Bootable CD-ROM specification, Version 1.0, Jan. 25, 1995, published by Phoenix Technologies and IBM, is incorporated herein its entirety.

Each type of drive emulation has its own advantages and disadvantages. The floppy mulation allows the CD-ROM drive to receive the same letter (D:) that it would normally receive. This is because the floppy drive, normally assigned to the A: drive, is reassigned o the B: drive, and all drives from C: onwards receive their normal assignments. Therefore, the CD-ROM remains assigned to the D: drive.

On the other hand, hard drive emulation installs the hard drive image as drive C: and thereby causes a shift in the assignment of drive letters from C: onwards from their normal assignments. Therefore, the drive letter assigned to the CD-ROM image is shifted by one letter. However, the hard drive emulation allows the emulated drive to be of any size.

Accordingly, multiple-boot CD-ROMs allow a user to choose which emulation they would prefer after considering the advantages and disadvantages of the two emulations. However, multiple boot images suffer from the disadvantage that they use valuable storage space by storing two boot images which are very similar to each other. Therefore, for example, if a fairly large boot image is required, it can significantly reduce the typical CD-ROM storage of 600 Megabytes("Mb") and, thereby, make it undesirable to store two largely identical boot images.

FIG. 2A shows a normal CD-ROM configuration that is not bootable and uses the Root Directory structure and CD-ROM drivers in the operating system to access the CD-ROM images.

FIG. 2B shows a CD-ROM with a single boot configuration in which a BIOS with a single Boot-Image capability accesses the Initial/Default entry 25 to access a single bootable disk image 26. After loading the operating system, the system can revert to standard Root Directory and CD-ROM drivers to access the CD-ROM images.

FIG. 3 is a map of the ISO 9660 operating environment in which a map 30 of the 1 Mb of main memory is shown. The lowest area is occupied by the BIOS data area 31, and which provides identification and access to the drives by BIOS functions, such as the INT 13 h functions. The usual BIOS functions, however, do not provide the access to the CD-ROM which is instead defined by ISO-9660 device driver software residing in a operating system, for example, DOS 32.

FIGS. 4A and 4B show the enhancements to the BIOS 30a described in the El Torito specification that enable an the INT 13 calls to recognize the CD-ROM and to provide hard drive and floppy disk image emulation based on files stored on the CD-ROM. That is, they treat the respective emulation images as if they are the hard drive or floppy disk drive and the other drives are relabeled to accommodate this emulation. For example, the allocation of the A: drive to the floppy disk image or the C: drive to the hard drive image, respectively, causes the actual floppy drive or the actual hard drive to be relabeled from their normal assignments.

FIG. 2C shows a CD-ROM BIOS with multiple Boot-Image capability in which a BIOS can access any one of a number of Boot Disk Images 26 listed in the booting catalog 25. After loading the operating system, the system can access other items in the disk image with standard BIOS Interrupt (INT) 13 calls or return to normal access of CD-ROM images using CD-ROM drivers and the Root Directory. However, this multiple boot—multiple disk image configuration suffers from the disadvantage mentioned earlier that it stores a separate bootable disk image corresponding to each of the multiple boot images of the CD-ROM. Accordingly, this configuration uses more space on the CD-ROM and reduces the space available on a CD-ROM.

Therefore, there is a requirement for a CD-ROM configuration which allows a multiple boot image emulation from a CD-ROM while maximizing the space available for storing CD-ROM images.

SUMMARY OF THE INVENTION

Therefore, it is a general object of the invention to alleviate the problems and shortcomings identified above.

One of the objects of the invention is to provide a method for the multiple emulation by a bootable storage media by using only one bootable disk image.

Another one of the objects of the invention is provide a computer system including a bootable storage media that can provide multiple emulation by the bootable storage media while using only a single bootable disk image.

Another one of the objects of the invention is to provide a computer article of manufacture including a computer usable medium that is bootable and provides both hard disk emulation and floppy disk emulation from a single bootable disk image.

Another object of the invention is to provide a method for the multiple emulation by a bootable CD-ROM containing a single bootable disk image without making any changes to the BIOS code.

Another object of the invention is to provide a computer system including a CD-ROM in which multiple emulation is provided on a single bootable disk image without making any changes to the BIOS code.

A further object of the invention is to provide a method for the multiple emulation by a bootable CD-ROM containing a single bootable disk image having one boot record at the beginning of the bootable disk image and a second boot record at a predetermined boundary in the bootable disk image.

A further object of the invention is to provide a computer system with a bootable CD-ROM with multiple emulation in a single bootable disk image in which one boot record is at the beginning of the single bootable disk image, whereas a second boot record is at a predetermined sector boundary in the bootable disk image.

Another object of the invention is to provide a method and a computer system in which the second boot record is at a predetermined Kilobytes ("K") sector boundary in the single bootable disk image.

These and other objects are achieved by providing a method for booting a computer system from a bootable storage media, such as a bootable CD-ROM, having multiple emulations in a single bootable disk image, the method including the steps of: storing a hard disk image on the bootable disk image of the CD-ROM, the hard disk image including a Master Boot Record ("MBR"), a hard disk DOS Boot Record ("DBR") and a first copy of a File Allocation Table ("FAT"); adding at least one sector of reserved area between the hard disk DBR and the FAT; aligning a boundary in the reserved area, at a predetermined sector boundary in the bootable disk image, by adding zero or more reserved sectors between the hard disk DBR and the FAT; adding a floppy DBR at the aligned boundary at the predetermined 2K sector boundary in the bootable disk image; and building a boot catalog entry of the CD-ROM to contain at least a first and a second entry, the first entry pointing to the MBR at the bootable disk image and the second entry pointing to the floppy DBR at the predetermined 2K sector boundary in the bootable disk image.

The present invention further provides a computer system including a bootable storage media, such as a bootable CD-ROM, having multiple emulations in a single bootable disk image, the CD-ROM comprising: a hard disk image on the bootable disk image of the CD-ROM, the hard disk image including a Master Boot Record ("MBR"), a hard disk DOS Boot Record ("DBR") and a first copy of a File Allocation Table ("FAT"); at least one sector of reserved area between the hard disk DBR and the FAT; a floppy DBR located at a predetermined sector boundary in the reserved area, by adding zero or more reserved sectors between the hard disk DBR and the FAT; and a boot catalog of the CD-ROM that includes at least a first and a second entry, the first entry pointing to the MBR at the bootable disk image and the second entry pointing to the floppy DBR at the predetermined sector boundary in the bootable disk image.

The present invention also provides a computer article of manufacture to be loaded into a drive of a computer, such as a CD-ROM drive, having a memory, the article of manufacture comprising a computer usable medium including computer readable program code and computer readable data structures embodied therein. The computer usable medium includes a bootable disk image data structure including a hard disk image data structure embodied therein, the hard disk image including at least one reserved sector. A floppy DOS Boot Record is located in the reserved sector of the hard disk image, wherein the computer can boot from the computer usable medium by emulating either a hard disk or a floppy disk. The computer article of manufacture further includes a boot catalog data structure having a first entry and a second entry, the first entry pointing to a beginning of the hard disk image and the second entry pointing to the floppy DBR. The floppy DBR is located at a predetermined sector boundary in the hard disk image. Preferably, zero or more alignment sectors are provided to align the floppy DBR at a predetermined 2K sector boundary in the hard disk image.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 2A is a diagram that shows a normal non-bootable CD-ROM configuration.

FIG. 2B is a diagram that shows a CD-ROM with a single boot configuration.

FIG. 2C is a diagram that shows a CD-ROM with multiple boot image capability with separate boot disk images providing the multiple boot image capability.

DESCRIPTION OF THE PREFERRED EMBODIMENT(S)

Figure 1:
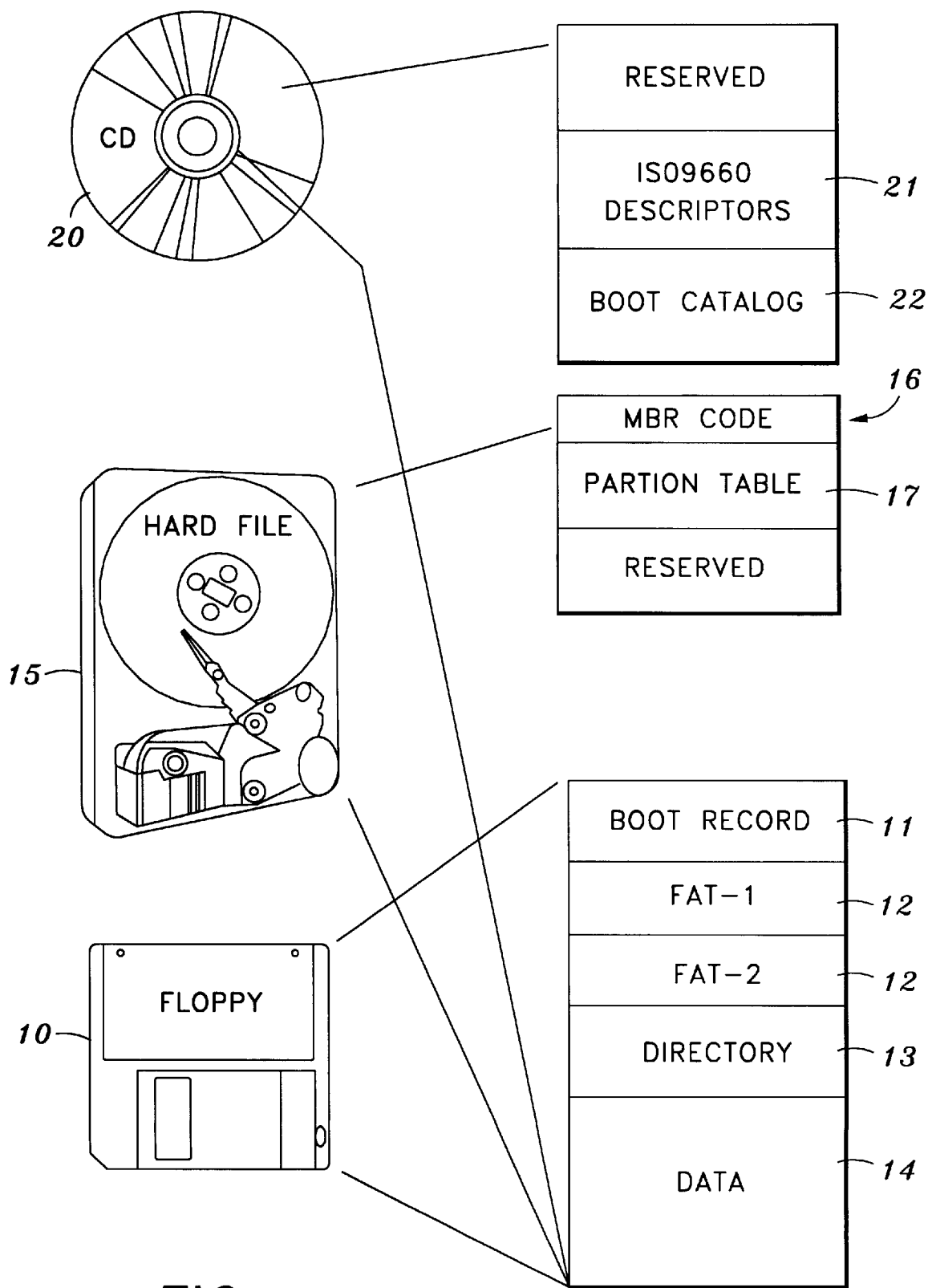
FIG. 1 is a diagram showing the configurations of image formats of floppy diskette, hard disk and CD-ROM storage media.
Figure 3:
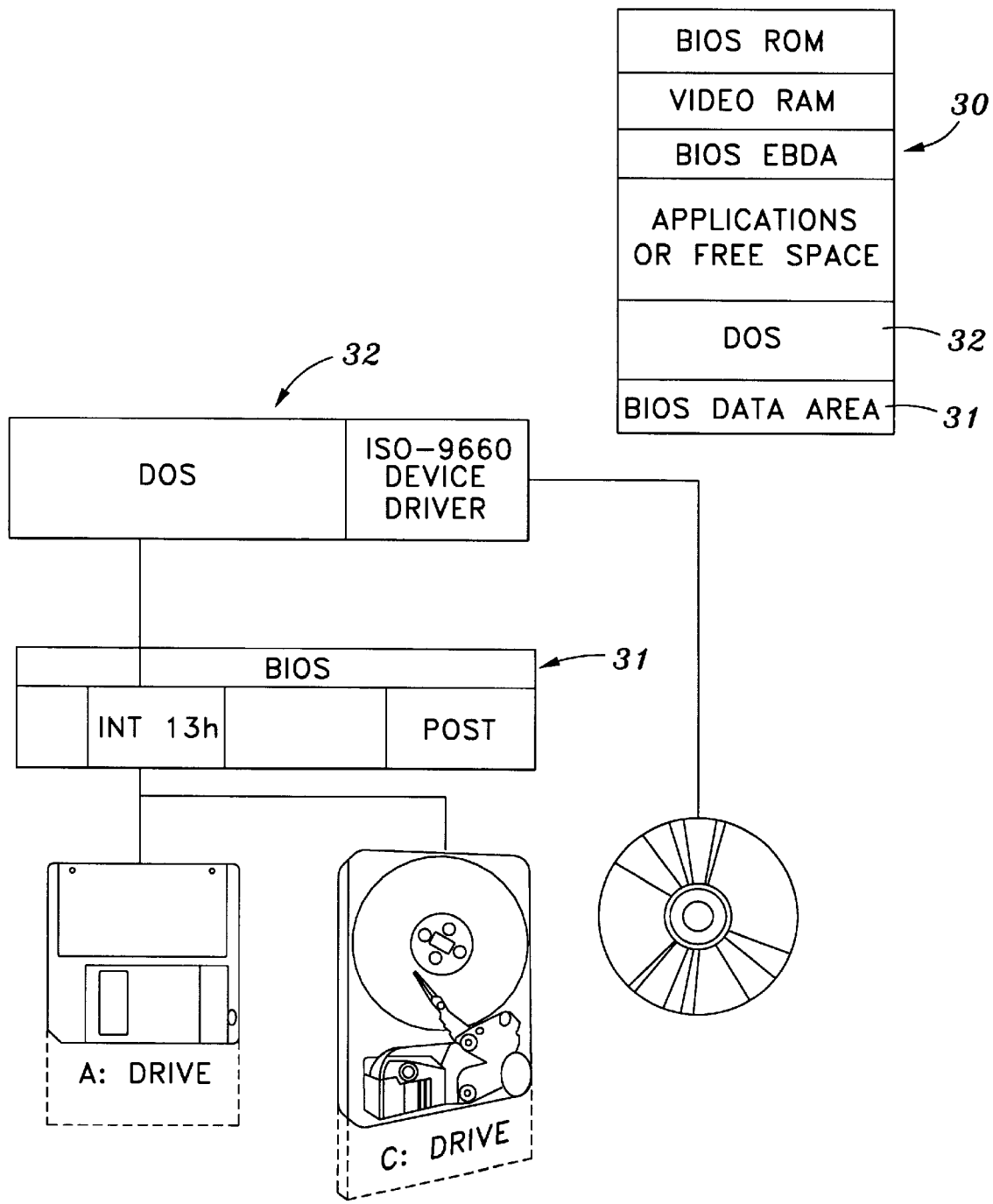
FIG. 3 is a diagram showing a conventional ISO-9660 CD-ROM operating environment.
Figures 4A, 4B:
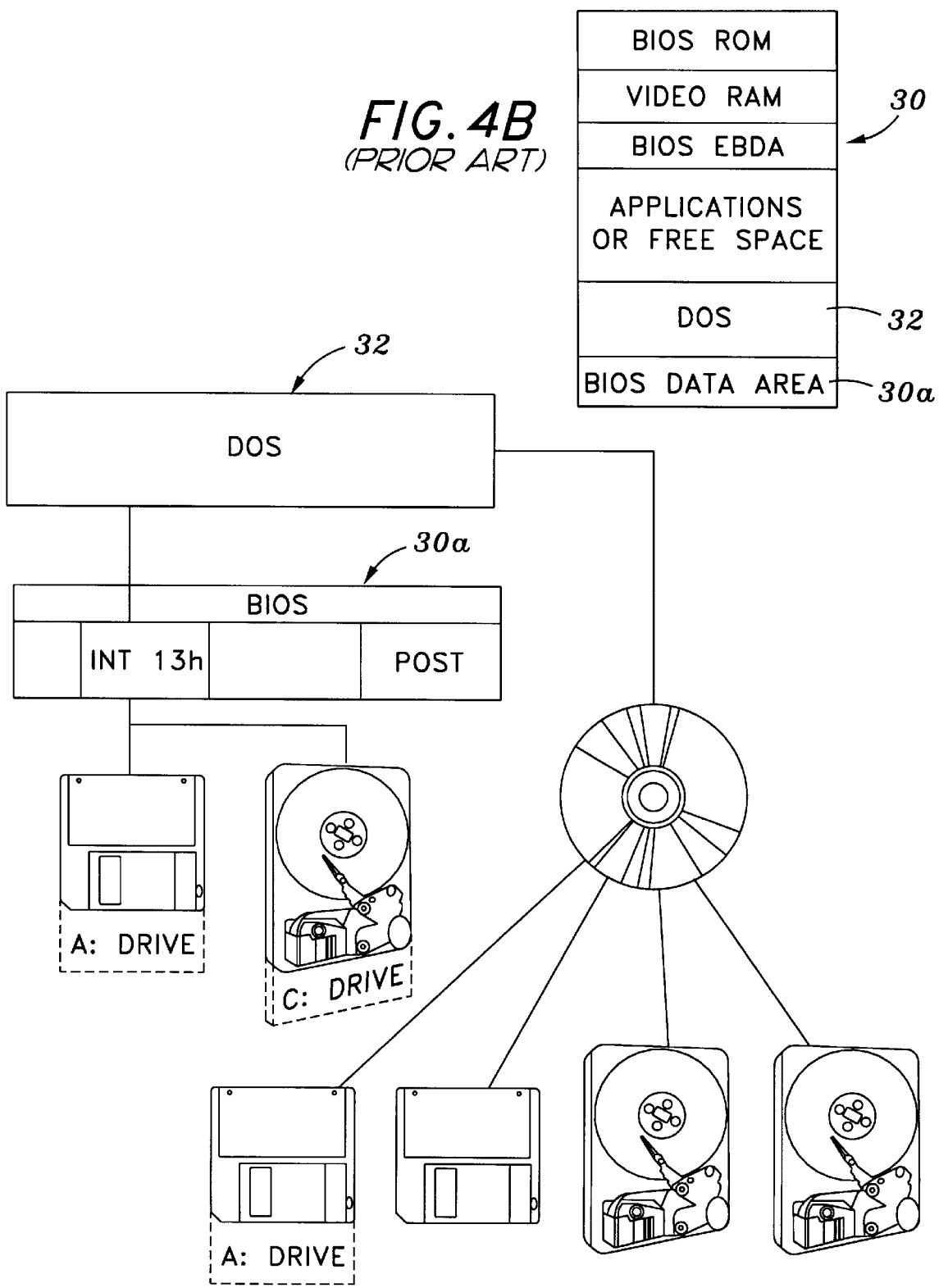
FIGS. 4a and 4b are diagrams of an alternative CD-ROM operating environment in which the BIOS functions provide access to the CD-ROM.

The present invention provides, in a general aspect, a method for booting a computer system from a bootable storage media, such as a bootable CD-ROM, that has multiple emulations in a single bootable disk image. The method includes storing a modified hard disk image on a bootable disk image of the CD-ROM. The bootable disk image has a master boot record corresponding to a hard disk emulation and includes a hard disk DOS boot record ("DBR") and two File Allocation Tables ("FAT") together with a root directory and a data area. A reserved area of at least one sector is added between the hard disk DBR and the FAT. Zero or more alignment sectors in the reserved area are used to define a boundary which is at a predetermined sector boundary in the bootable disk image. A floppy DBR is then added at the predetermined sector boundary in the bootable disk image. The boot catalog entry of the CD-ROM has at least two entries, a first entry that points to the MBR at the bootable disk image that allows for the hard disk emulation. The second entry points to the floppy DBR at the predetermined sector boundary in the bootable disk image and thereby allows for the floppy disk emulation.

In another general aspect, the present invention provides a computer system with a bootable storage media, such as a bootable CD-ROM, that allows for multiple emulations from a single bootable disk image stored on the CD-ROM. In this aspect, a modified hard disk image is provided on the bootable disk image with the hard disk image including a master boot record, a hard disk DOS boot record and two copies of a File Allocation Table. The hard disk image is modified by adding at least one sector of reserved area between the hard disk DBR and the first copy of the FAT. A floppy DBR is located in the reserved area at a predetermined distance from the beginning of the bootable disk image with zero or more alignment sectors being added to align the floppy DBR to the boundary at the predetermined distance from the start of the bootable disk image. A boot catalog of the CD-ROM includes at least two entries, a first entry that points to the MBR and permits the hard disk emulation and a second entry that points to the floppy DBR and permits the floppy drive emulation.

In yet another general aspect, the present invention provides a computer article of manufacture suitable for loading into a CD-ROM drive of a computer having a memory. The computer article of manufacture includes a computer usable medium that has computer readable program code and computer readable data structures embodied therein. The computer usable medium includes a bootable disk image data structure including a hard disk image data structure embodied therein. The hard disk image includes at least one reserved sector, and a floppy DOS Boot Record is located in the reserved sector of the hard disk image, wherein the computer can boot from the computer usable medium by emulating either a hard disk or a floppy disk. The computer article of manufacture further includes a boot catalog data structure having a first entry and a second entry, the first entry pointing to a beginning of the hard disk image and the second entry pointing to the floppy DBR. The floppy DBR is located at a predetermined 2K sector boundary in the hard disk image. Preferably, zero or more alignment sectors are provided to align the floppy DBR at the predetermined 2K sector boundary in the hard disk image.

Figure 5:
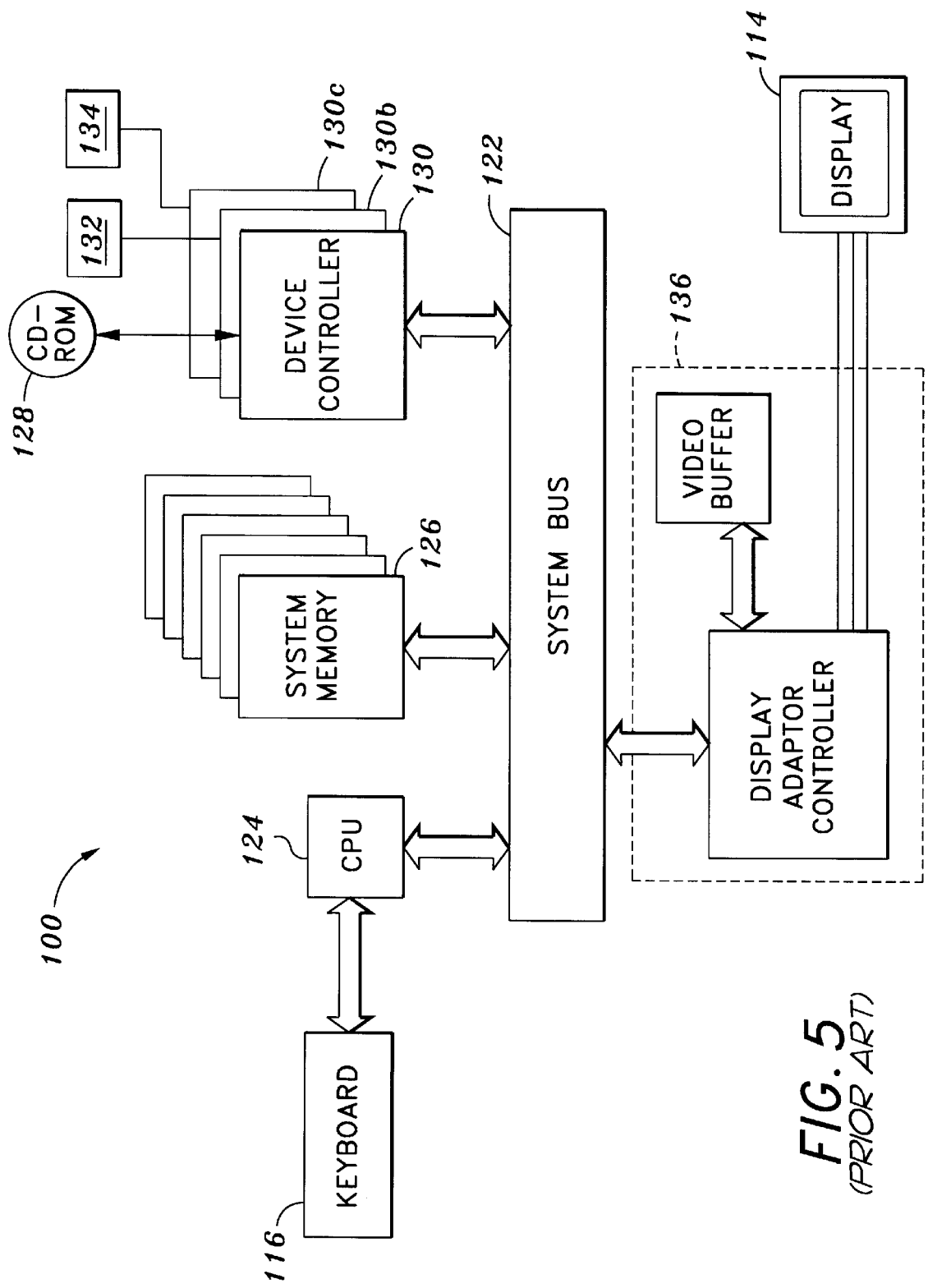
FIG. 5 is a block diagram showing the components of a typical computer system.

With reference to the figures, FIG. 5 is a block diagram showing the components of a typical computer system 100. The computer system 100 includes a system bus 122 which connects the different components of the computer system 100 including a Central Processing Unit (CPU) 124 and a main or system memory 126. Data, including multimedia data, may be stored in a CD-ROM 128 that can be accessed by the CPU through a device controller 130. Other data, stored in a floppy disk drive 132 or a hard disk drive 134 can also be accessed by the CPU 124 through corresponding controllers 130b and 130c. Other standard components of the computer system 100 include a data input device, such as a keyboard, 116 and a data display device 114 that is connected to the system bus 122 through a video controller 136.

It is to be understood that the preferred embodiments of the present invention will hereafter be discussed using a bootable CD-ROM. However, the principles of the present invention can be used with any other bootable storage media, now in use or developed in the future, which uses the concept of a disk image to emulate either a floppy or a hard disk drive. For example, it is possible that a storage media presently in use, such as the Digital Video Disc (DVD), could be adapted to use the present invention which is described herein using the CD-ROM storage medium in the preferred embodiments.

Preferably, the CD-ROM 128 is bootable and the CD-ROM 128 is formatted in accordance with the specification of the present invention as described further herein.

For a better understanding of the format of a DOS formatted logical drive, Table 1 shows the structure of a BIOS parameter block. The values stored in the fields of the BIOS parameter block defines the format of a DOS formatted logical drive. For example, field reference number two defines the number of reserved sectors, field reference number ten defines the number of hidden sectors and field reference number twelve defines the physical drive number. It should be noted that sample values in all the tables are provided by way of example only and do not limit the present invention in any way.

TABLE 1

| Reference # | Byte Offset | Field Length | Sample Value | Meaning |
|---|---|---|---|---|
| 0 | 00h | Word | 200h | Number of bytes per sector |
| 1 | 02h | Byte | 8 | Number of sectors per cluster |
| 2 | 03h | Word | 1 | Number of reserved sectors, accounts for the DBR sector |
| 3 | 05h | Byte | 2 | Number of File Allocation Tables |
| 4 | 06h | Word | 200h | Number of root director entries |
| 5 | 08h | Word | 0 | Total Number of Sectors if less than 65,536 |
| 6 | 0Ah | Byte | F8h | Media descriptor |
| 7 | 0Bh | Word | A0h | Number of sectors per File Allocation Table |
| 8 | 0Dh | Word | 3Fh | Number of sectors per track |
| 9 | 0Fh | Word | 10h | Number of heads |
| 10 | 11h | Dword | 3Fh | Number of hidden sectors (0 for a floppy) |
| 11 | 15h | Dword | 1FE034h | Total number of sectors if word at offset 8 is 0 |
| 12 | 19h | Byte | 80h | Physical drive number (0 for floppy) |

Table 2 shows the structure of a DOS Boot Record. The DOS boot record is found at the beginning of a DOS partition in a hard disk, and in the boot sector of a DOS formatted floppy disk. The DOS Boot Record contains code for booting and a BIOS parameter block of the type defined above. The purpose of the code is to locate and execute the operating system files during the booting process of a computer.

TABLE 2

| Byte Offset | Field Length | Sample Value | Meaning |
|---|---|---|---|
| 000h | 3 bytes | N/A | Jump over the BIOS parameter block |
| 003h | 8 bytes | N/A | System name field |
| 00Bh | 51 bytes | N/A | BIOS parameter block |
| 03Eh | 448 bytes | N/A | Code portion of the DOS boot record |
| 1FEh | 2 bytes | 55h AAh | Validation signature |

Table 3 shows the structure of a Master Boot Record. The Master Boot record is found in the boot sector of a fixed (or "hard") disk. It contains boot code and a partition table. The purpose of the boot code is to locate the active partition, and then load the operating system corresponding to the active partition.

TABLE 3

| Byte Offset | Field Length | Sample Value | Meaning |
|---|---|---|---|
| 000h | 446 bytes | | Code portion of the Master boot record |
| 1Beh | 64 bytes | | Partition table (typically four 16 byte entries) |
| 1Feh | 2 bytes | 55h AAh | Validation signature |

Table 4 shows the structure of a partition table entry contained in a Master Boot Record. A partition table shows the allocation of storage space in a hard disk. Each entry in the partition table relates to a single partition that can contain its own set of operating system files. A partition table entry defines a partition by designating the starting and ending addresses for a partition. Other fields in the partition table define, for example, if the partition is bootable or define the total number of sectors in the partition.

TABLE 4

| Byte Offset | Field Size | Meaning |
|---|---|---|
| 00h | Byte | Boot indicator flag. 80h if partition bootable, otherwise 00h |
| 01h | Byte | Starting head of the partition |
| 02h | Word | Starting cylinder and sector of partition |
| 04h | Byte | System type |
| 05h | Byte | Ending head of partition |
| 06h | Word | Ending cylinder and sector of partition |
| 08h | Dword | Prior Sectors |
| 0Ch | Dword | Total sector in partition |

Figure 6A:
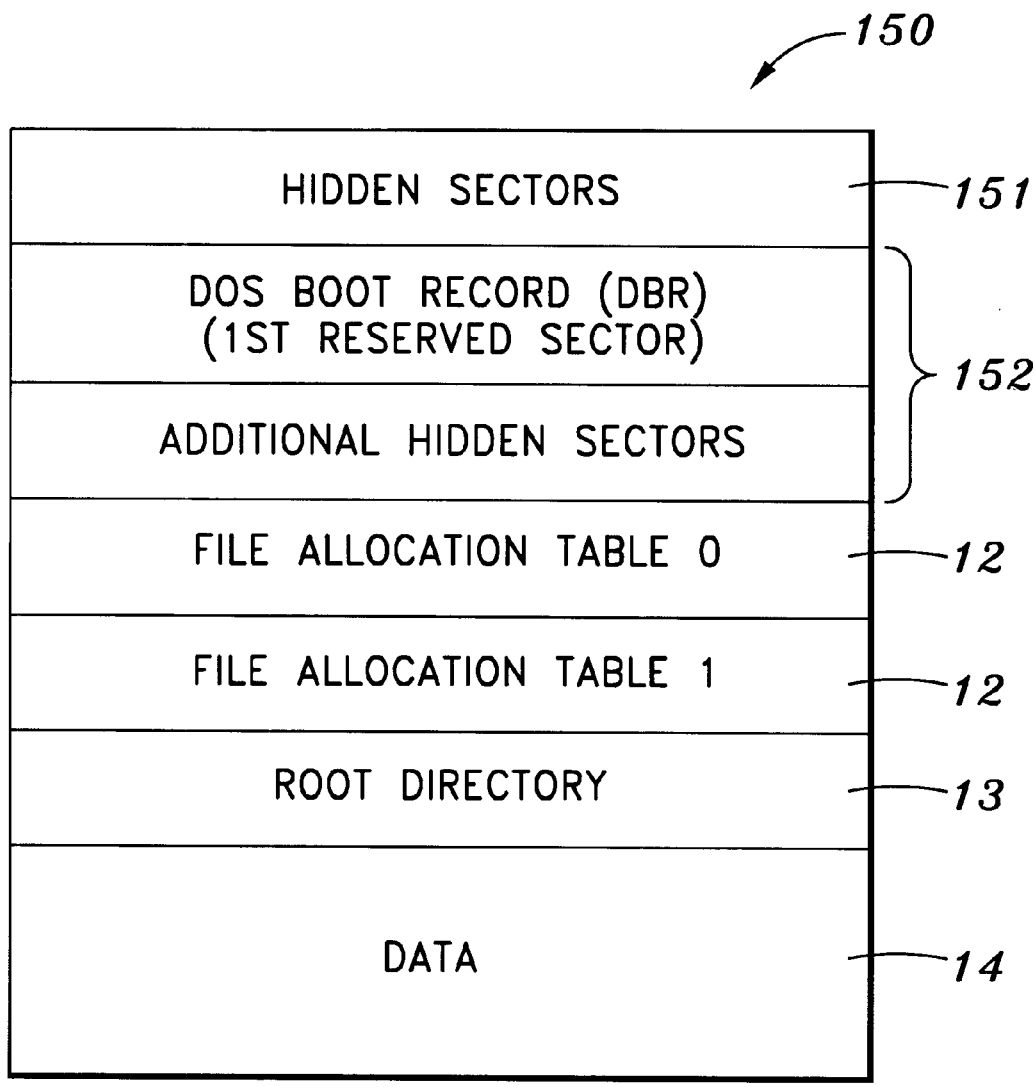
FIG. 6A is a schematic diagram showing the structure of a DOS formatted disk.

FIG. 6A is a schematic diagram showing the structure 150 of a general DOS formatted disk. All DOS formatted disks, which are described by the DIOS parameter block, have a hidden sectors area 151 consisting of 0–63 sectors. The number of hidden sectors, if any, in the hidden sectors area 151 is specified by a parameter in the BIOS parameter block. The hidden sectors are followed by a reserved sectors area 152 of at least one sector which must contain a BIOS parameter block. In addition, additional reserved sectors can be allocated the contents of which are ignored by the operating system. Accordingly, these additional reserved sectors can be used to store alternate DOS Boot Records and, thereby, provide multiple boot capability by booting from the appropriate boot record. The number of reserved sectors is also specified in a parameter of the BIOS parameter block.

Figure 6B:
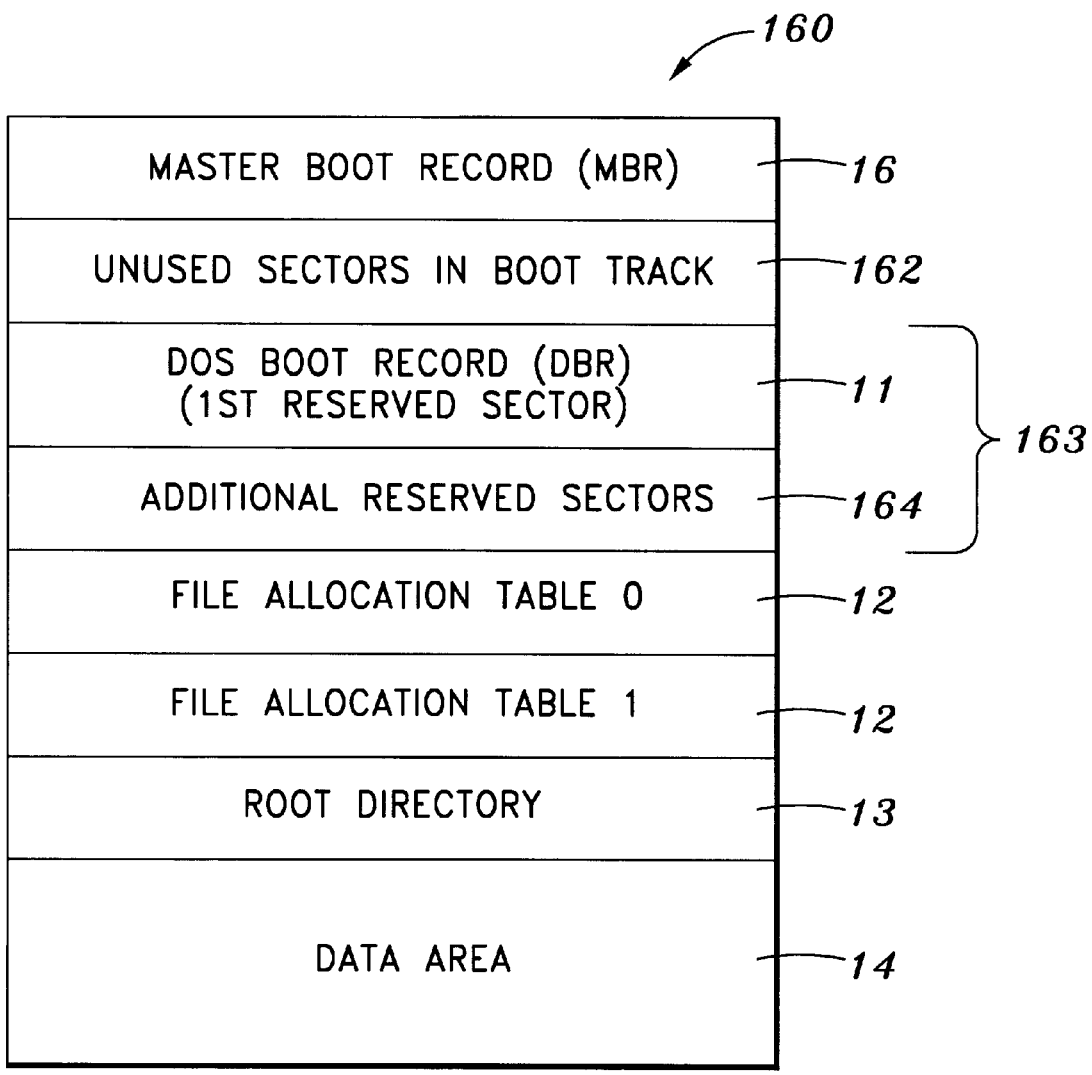
FIG. 6B is a schematic diagram showing the structure of a DOS hard disk.

FIG. 6B is a schematic diagram showing the structure of a DOS hard disk 160. A DOS formatted hard disk 160 begins with a Master Boot Record ("MBR") 16 that contains a partition table (not shown) followed by a number of unused sectors 162 which are usually the remaining sectors in the first track. The partition table indicates which, if any, of the partitions is the active partition. It also provides the starting address of each partition. The starting address typically includes the starting cylinder, head, and sector information. The first reserved sector is the first sector of a partition and the first reserved sector must contain a BIOS parameter block. Therefore, fixed disks 160 start with a boot track which contains a MBR 16 in the first sector. The entire boot track is accounted for in the hidden sectors field of the BIOS parameter block. Fixed disks 160 can also contain a reserved area 163 of at least one sector which is used for a DBR 11 but may also be formatted with additional reserved sectors 164 other than the sector containing the DBR. The reserved sectors area 163 is also accounted for by a parameter in the BIOS parameter block.

Figure 6C:
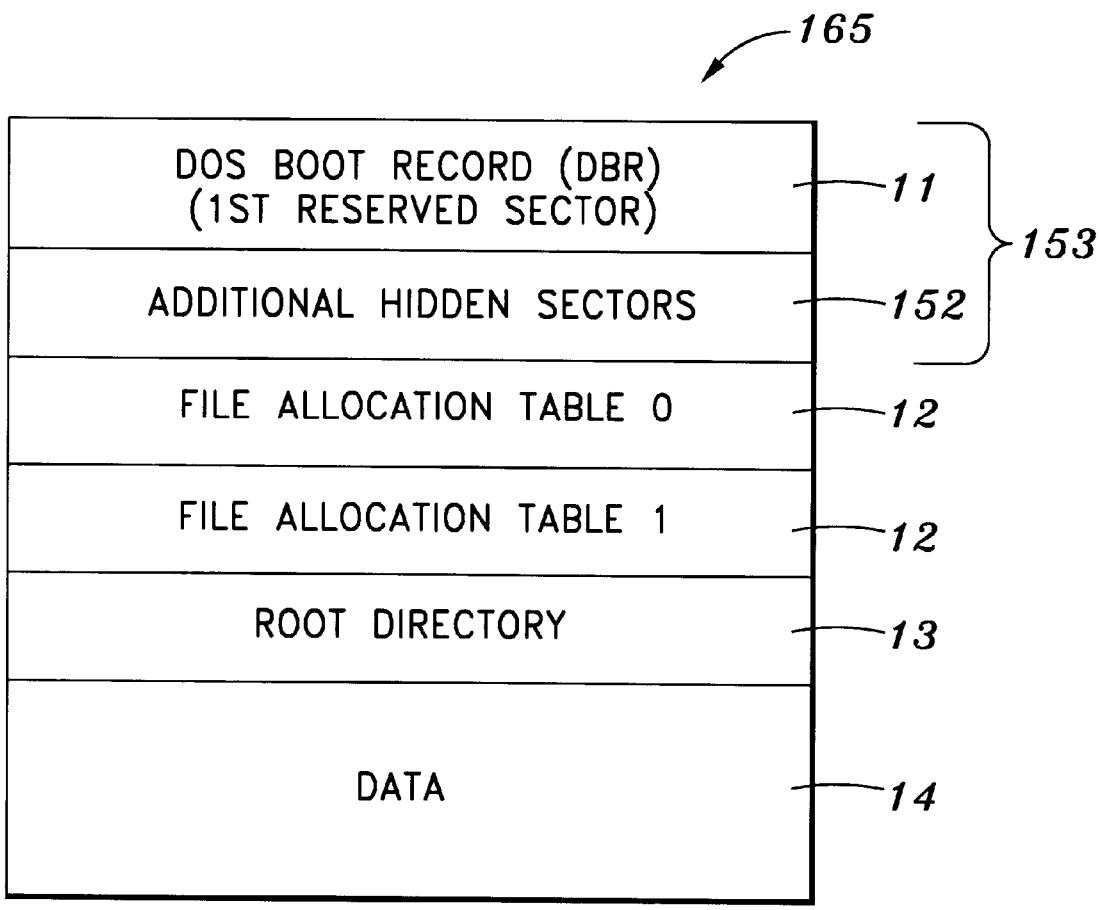
FIG. 6C is a schematic diagram showing the structure of a DOS floppy disk.

FIG. 6C is a schematic diagram showing the structure 165 of a DOS floppy disk. A floppy disk 165 formatted under DOS must have a hidden sectors area of zero sectors. Accordingly, a DOS floppy disk image cannot have a partition table. Therefore, the hidden sectors parameter in the BIOS parameter block must have a value of zero for a floppy disk 165. The first sector of the media must contain the first reserved sector which is a DOS Boot Record 11 that includes a BIOS parameter block. In addition, there may be additional reserved sectors 152 that may be allocated when the floppy disk is formatted. The total number of reserved sectors 153 is accounted for in the reserved sectors field of the BIOS parameter block.

Figure 7:
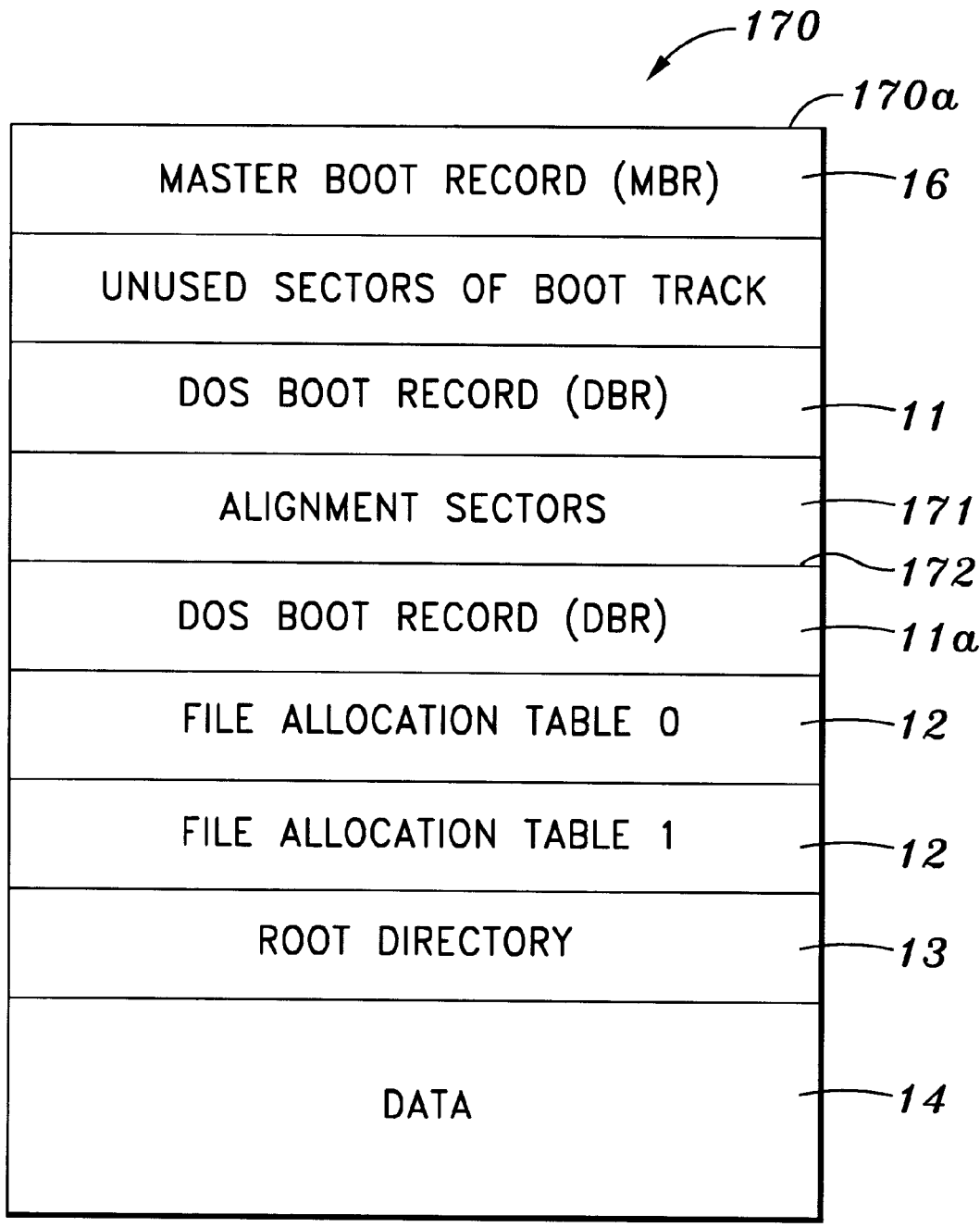
FIG. 7 is a schematic diagram showing the structure of a multiple emulation single bootable disk image according to the present invention.

FIG. 7 is a schematic diagram showing the structure of a multiple emulation single bootable disk image 170 according to the present invention. The disk image used for multiple emulation single image bootable image 170 is a modified hard disk image 160, as shown in FIG. 6B. To the hard disk image 160, zero or more additional reserved "alignment" sectors are allocated in addition to the sector reserved for a second DOS Boot Record 11a and the sector containing the DOS Boot Record 11 for the hard disk partition. These additional sectors are used to align and store the second DOS Boot Record 11a which includes a floppy BIOS parameter block. Because the second DOS Boot Record 11a is added to the hard disk image 170 that already contains file allocation tables 12 and a root directory 13, the second DOS Boot Record 11a uses those file allocation tables 12 and the root directory 13 in common with the first DOS Boot Record 11. Accordingly there is no need to use a separate image for floppy disk emulation.

The second DOS Boot Record 11a should be at a predetermined sector boundary 172 in the disk image 170a. Preferably, the predetermined boundary 172 should be at a boundary at a 2K sector boundary. To facilitate the location of the second DOS Boot Record 11a at the predetermined boundary 172, a few alignment sectors 171 are provided. The alignment sectors 171 ensure that the second DOS Boot Record 11a is at the predetermined boundary 172 in the disk image 170a. Preferably, zero or more alignment sectors 171 are provided. Therefore, at least one additional reserved sector is added to the bootable hard disk image configuration and these additional reserved sectors include the second floppy DBR 11a and the zero or more alignment sectors 171.

In a preferred embodiment, the storage media or CD-ROM sector boundary is at a 2K boundary whereas DOS floppy or hard disk sectors are 512 bytes. Accordingly, between zero to three DOS alignment sectors are provided to define the predetermined sector boundary at the next 2K sector boundary. However, the predetermined 2K sector boundary 172 can be at any 2K sector boundary in the reserved area and an appropriate number of alignment sectors 171 can be provided.

Accordingly, this configuration of the disk image 170 creates two predetermined locations, 170a and 172, in the disk image 170 to which a CD-ROM boot catalog can point to. By providing a Master Boot Record 16 at one of these two locations, 170a, in a single boot image 170 and a floppy DOS Boot Record 11a at the other location 172 in the single bootable disk image 170, a CD-ROM boot catalog 22 can be used to boot from the CD-ROM emulating either a hard disk or a floppy disk from a single boot image.

Figure 8:
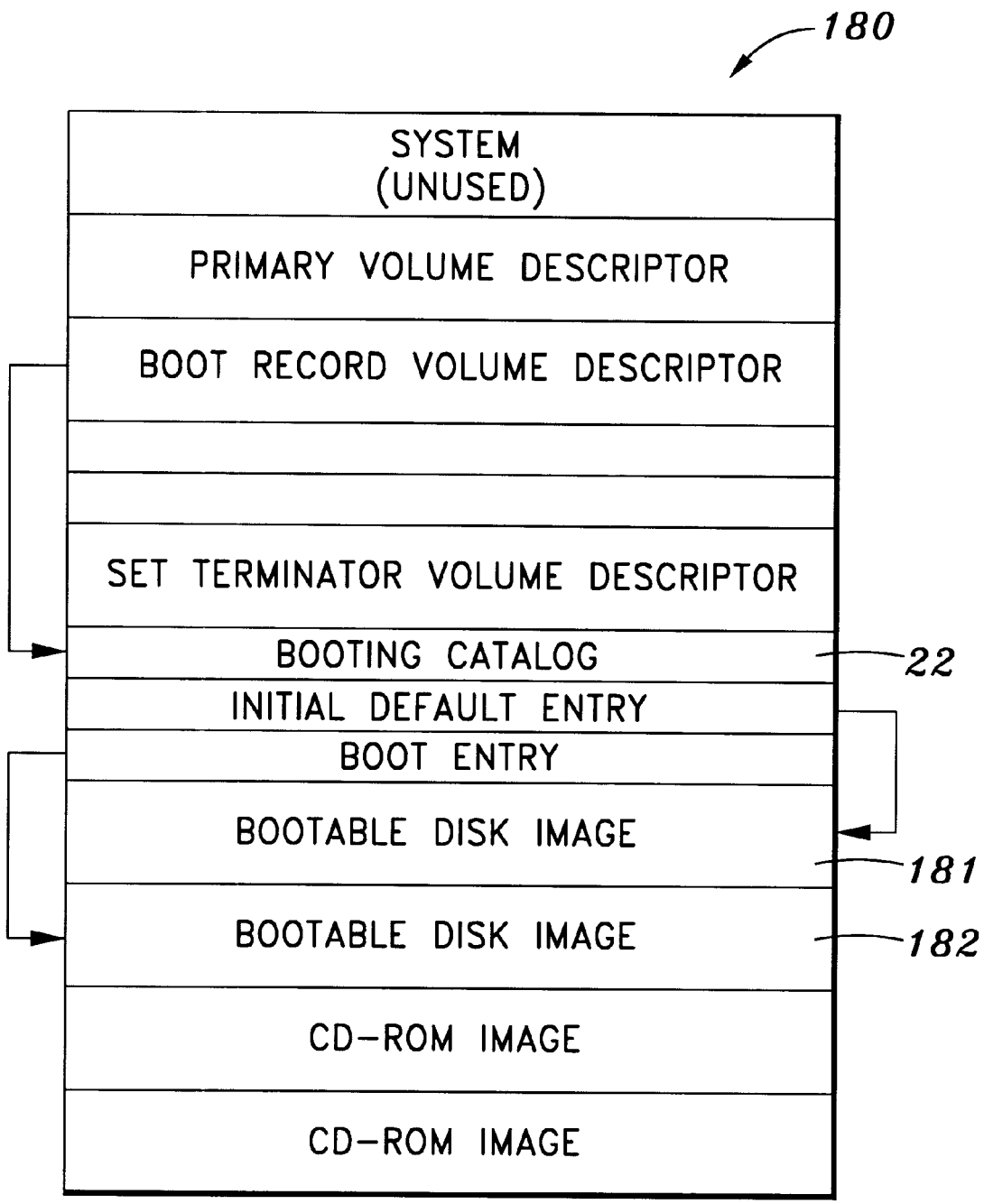
FIG. 8 is a schematic diagram showing the structure of a conventional bootable CD-ROM with multiple disk emulations.

FIG. 8 is a schematic diagram showing the structure of a conventional bootable CD-ROM 180 with multiple disk emulations. In this conventional configuration, the boot catalog 22 points to two separate bootable disk images, 181 and 182. Therefore, the CD-ROM is formatted to boot emulating either a hard disk or a floppy disk as either of the two bootable disk images 181 and 182 can be formatted to be a bootable hard disk image or a bootable floppy disk image. However, this configuration suffers from the disadvantage, discussed earlier, that the two bootable disk images use valuable storage space on the CD-ROM and thereby reduce the free space available for storing CD-ROM images.

Figures 9A, 9B:
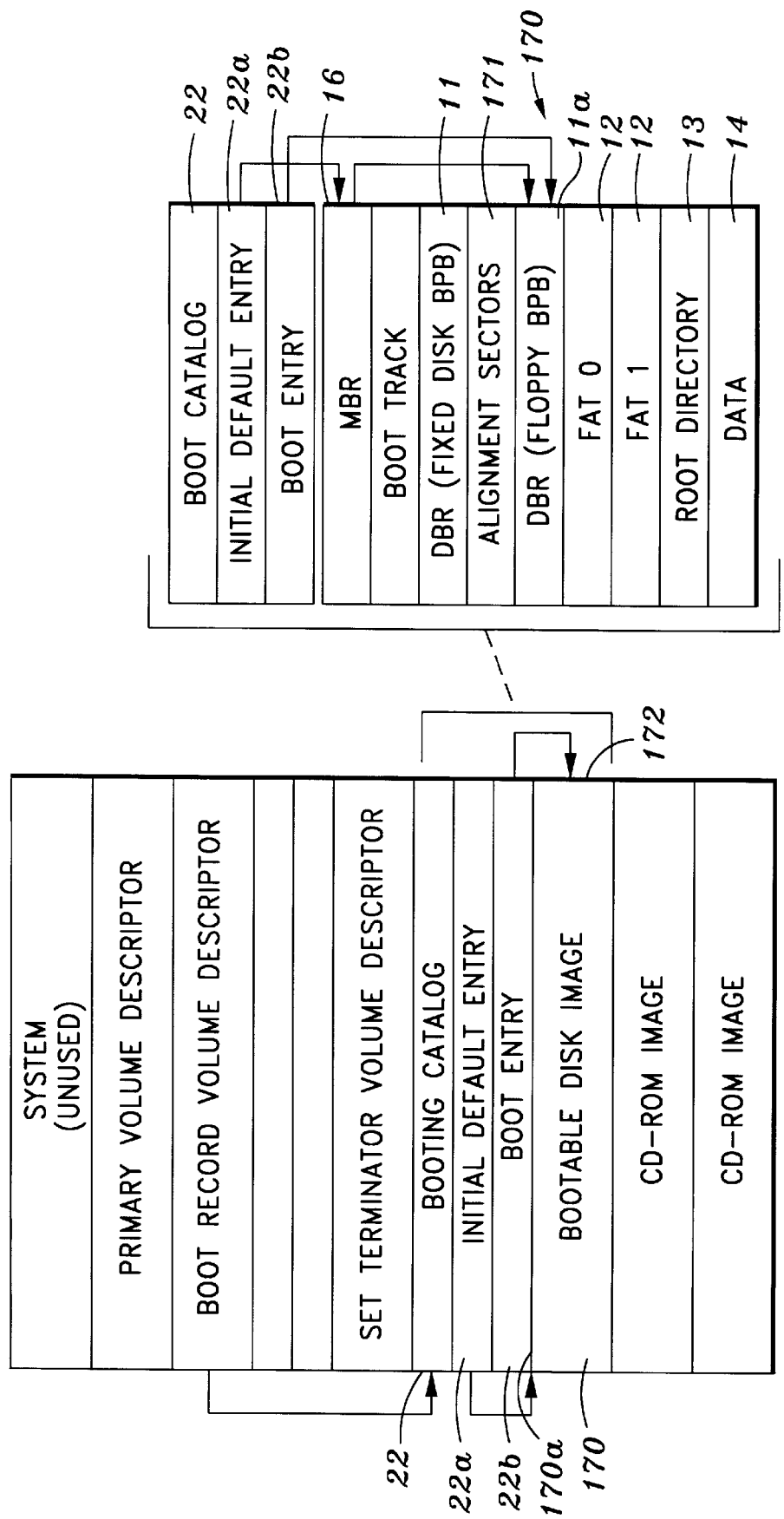
FIGS. 9A and 9B are schematic diagrams showing the structure of a bootable CD-ROM with multiple emulations from a single disk image according to the present invention.

FIGS. 9A and 9B are schematic diagrams showing the structure of a bootable CD-ROM 190 that provides multiple emulations from a single disk image 170 according to the present invention. The CD-ROM is formatted to have a boot catalog 22 that has a first entry 22a and a second entry 22b, each of which point to known or predetermined locations in the single disk image 170. Therefore, the first entry 22a points to the beginning point 170a of the multiple emulation single disk image 170, whereas the second entry 22b points to the predetermined sector boundary 172 of the single disk image 170. Since a hard disk Master Boot Record 16 is stored at the beginning of the single disk image 170 and a second DOS Boot Record 11a, configured for a floppy disk, is stored at the predetermined sector boundary 172, the CD-ROM 190 is formatted to boot emulating either a floppy disk or a hard disk while storing only a single bootable disk image 170.

Furthermore, the first entry 22a can be made the initial default entry so that the system boots from the CD-ROM emulating a hard disk as its default emulation mode. However, present invention facilitates providing a booting option that makes it possible to boot the system from the CD-ROM using floppy disk emulation from a single bootable disk 170. Accordingly, the present invention provides a bootable CD-ROM formatted for multiple emulation from a single bootable disk image. At the very least, this saves the space necessary to store a second bootable disk image on the CD-ROM, for example, the space required to store a floppy disk image is addition to a hard disk image.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A method for producing a bootable storage media comprising:

storing both a hard disk image and a floppy disk DOS Boot Record ("DBR") as a single bootable disk image on the storage media; and building a boot catalog of the storage media with a first entry and a second entry, the first entry pointing to the hard disk image and the second entry pointing to the floppy disk DBR.

2. The method according to claim 1, wherein the step of storing both a hard disk image and a floppy disk DBR comprises:

storing the hard disk image at the beginning of the bootable disk image; and storing the floppy disk DBR at a predetermined storage media sector boundary in the bootable disk image.

3. The method according to claim 2, wherein the step of storing the floppy disk DBR includes:

defining a predetermined sector boundary in a reserved area in the hard disk image; and storing the floppy disk DBR at the predetermined sector boundary.

4. The method according to claim 3, wherein the step of defining a predetermined sector boundary includes providing zero or more alignment sectors in a reserved area of the hard disk image.

5. A method for producing a boutable CD-ROM, the method comprising the steps of:

storing a hard disk image on a bootable disk image of the CD-ROM, the hard disk image including a Master Boot Record ("MBR"), a hard disk DOS Boot Record ("DBR") and a first copy of a File Allocation Table ("FAT");

adding at least one sector of reserved area between the hard disk DBR and the FAT;

aligning a boundary in the reserved area, at a predetermined CD-ROM sector boundary in the bootable disk image, by adding zero or more reserved sectors between the hard disk DBR and the FAT;

adding a floppy disk DBR at the aligned boundary at the predetermined CD-ROM sector boundary in the bootable disk image; and building a boot catalog entry of the CD-ROM to contain at least a first and a second entry, said first entry pointing to the MBR at the bootable disk image and said second entry pointing to said floppy disk DBR at the boundary of the predetermined CD-ROM sector boundary in the bootable disk image.

6. A method according to claim 5, wherein the step of aligning the boundary at the predetermined CD-ROM sector boundary includes adding zero or more reserved sectors between the hard disk DBR and the FAT.

7. A method according to claim 5, wherein said predetermined CD-ROM sector boundary is a 2K boundary.

8. A method according to claim 5, wherein the hard disk DBR includes a hard disk BIOS parameter block ("BPB") having a physical drive number value greater than one.

9. A method according to claim 5, wherein the floppy disk DBR includes a floppy BPB having a hidden sectors count of zero and a physical drive number value of less than two.

10. A computer system including a bootable storage media having multiple emulations in a single bootable disk image, the storage media comprising:

a hard disk image on the bootable disk image of the storage media;

a floppy DOS Boot Record ("DBR") in the hard disk image; and a boot catalog including a first entry and a second entry, the first entry pointing to the hard disk image and the second entry pointing to the floppy DBR.

11. The computer system according to claim 10, wherein the hard disk image is stored at the beginning of the bootable disk image and the floppy DBR is stored at a predetermined storage media sector boundary in the bootable disk image.

12. The computer system according to claim 11, wherein the predetermined sector boundary is located in a reserved area of the hard disk image.

13. The computer system according to claim 11, wherein the predetermined sector boundary is aligned by adding at least one alignment sector in a reserved area of the hard disk image.

14. The computer system according to claim 11, wherein the predetermined sector boundary is aligned by adding three or less alignment sectors in a reserved sectors area of the hard disk image.

15. A computer system including a CD-ROM having multiple emulations in a single bootable disk image, the CD-ROM comprising:

a hard disk image on the bootable disk image of the CD-ROM, the hard disk image including a Master Boot Record ("MBR"), a hard disk DOS Boot Record ("DBR") and a first copy of a File Allocation Table ("FAT");

at least one reserved sector of reserved area between the hard disk DBR and the FAT;

a floppy DBR located a boundary in the reserved area, at a predetermined CD-ROM sector boundary in the bootable disk image, by adding zero or more reserved sectors between the hard disk DBR and the FAT; and a boot catalog of the CD-ROM that includes at least a first and a second entry, said first entry pointing to the MBR in the bootable disk image and said second entry pointing to the floppy DBR at the predetermined CD-ROM sector boundary in the bootable disk image.

16. The computer system according to claim 15, wherein the at least one reserved sector comprises a number of sectors that allows the location of the floppy DBR at a 2K CD-ROM sector boundary.

17. The computer system according to claim 15, wherein the predetermined CD-ROM sector boundary is a 2K boundary.

18. The computer system according to claim 15 wherein the hard disk DBR includes a BIOS parameter block having a physical drive number value greater than one.

19. The computer system according to claim 15 wherein the floppy disk DBR includes a BIOS parameter block having a hidden sectors count of zero and a physical drive number value of less than two.

20. A computer article of manufacture to be loaded into a drive of a computer having a memory, comprising:

a computer usable medium including computer readable program code and computer readable data structures embodied therein, comprising:

a bootable disk image data structure including a hard disk image data structure embodied therein, the hard disk image including at least one reserved sector; and a floppy DOS Boot Record ("DBR") located in the reserved sector of the hard disk image, wherein the computer can boot from the computer usable medium by emulating either a hard disk or a floppy disk.

21. A computer article of manufacture according to claim 20, wherein the computer usable medium includes a boot catalog data structure having a first entry and a second entry, the first entry pointing to a beginning of the hard disk image and the second entry pointing to the floppy DBR, and wherein the computer article of manufacture can be loaded into a CD-ROM drive of the computer.

22. A computer article of manufacture according to claim 20, wherein the floppy DBR is located in the reserved sector at a predetermined sector boundary in the hard disk image.

23. A computer article of manufacture according to claim 22, wherein the predetermined sector boundary is a 2K boundary.

24. A computer article of manufacture according to claim 22, wherein the hard disk image includes zero or more alignment sectors so that the floppy DBR is aligned at the predetermined sector boundary in the hard disk image.

* * * * *